United States Patent
Ohmura

(10) Patent No.: US 9,670,646 B2
(45) Date of Patent: Jun. 6, 2017

(54) WORKING VEHICLE

(71) Applicant: KOMATSU LTD., Minato-ku, Tokyo (JP)

(72) Inventor: Ken Ohmura, Hitachinaka (JP)

(73) Assignee: KOMATSU LTD., Tokyo (JP)

(*) Notice: Subject to any disclaimer, the term of this patent is extended or adjusted under 35 U.S.C. 154(b) by 35 days.

(21) Appl. No.: 14/655,288

(22) PCT Filed: Mar. 10, 2015

(86) PCT No.: PCT/JP2015/057052
§ 371 (c)(1),
(2) Date: Jun. 24, 2015

(87) PCT Pub. No.: WO2015/137354
PCT Pub. Date: Sep. 17, 2015

(65) Prior Publication Data
US 2016/0265194 A1    Sep. 15, 2016

(51) Int. Cl.
*B62D 25/12*  (2006.01)
*B62D 25/13*  (2006.01)
(Continued)

(52) U.S. Cl.
CPC ............ *E02F 9/0866* (2013.01); *B60K 11/02* (2013.01); *B60K 13/04* (2013.01); *E02F 9/0841* (2013.01);
(Continued)

(58) Field of Classification Search
CPC ............ F01N 2340/04; F01N 2590/08; F01N 13/1822; F01N 13/1805; B60K 13/04;
(Continued)

(56) References Cited

U.S. PATENT DOCUMENTS 1,232,550 A * 7/1917 Huff ..................... B62D 25/105
180/69.25
1,612,706 A * 12/1926 De Vries Edward B62D 25/105
180/69.25
(Continued)

FOREIGN PATENT DOCUMENTS

CN    102105639 A    6/2011
CN    202644623 U    1/2013
(Continued)

OTHER PUBLICATIONS

International Search Report (ISR) dated Jun. 2, 2015 issued in International Application No. PCT/JP2015/057052.
(Continued)

*Primary Examiner* — J. Allen Shriver, II
*Assistant Examiner* — Travis Coolman
(74) *Attorney, Agent, or Firm* — Holtz, Holtz & Volek PC

(57) ABSTRACT

A wheel loader includes: an exhaust gas aftertreatment device disposed above an engine and housed in an engine compartment along with the engine; an upper exterior cover covering an upper side of the engine compartment; an air inlet through which a cooling air is introduced into the engine compartment; and a fan configured to supply the cooling air to the engine compartment through the air inlet. The exhaust gas aftertreatment device includes a treatment unit configured to treat exhaust gas and is oriented with a longitudinal direction of the treatment unit being parallel with a vehicle front-rear direction. The air inlet is disposed at a front side of the exhaust gas aftertreatment device.

6 Claims, 12 Drawing Sheets

(51) Int. Cl.
  *B62D 25/10* (2006.01)
  *E02F 9/08* (2006.01)
  *F01N 13/18* (2010.01)
  *B60K 13/04* (2006.01)
  *B60K 11/02* (2006.01)
  *F01N 3/021* (2006.01)
  *F01N 3/20* (2006.01)
  *B60K 11/06* (2006.01)
  *E02F 3/34* (2006.01)

(52) U.S. Cl.
  CPC ............ *E02F 9/0891* (2013.01); *F01N 3/021* (2013.01); *F01N 3/2066* (2013.01); *F01N 13/1805* (2013.01); *B60K 11/06* (2013.01); *B60Y 2200/415* (2013.01); *E02F 3/34* (2013.01); *F01N 2260/022* (2013.01); *F01N 2590/08* (2013.01)

(58) Field of Classification Search
  CPC ........ B60K 13/06; B60K 11/00; B60K 11/04; B62D 25/10; B62D 25/12
  See application file for complete search history.

(56) References Cited

U.S. PATENT DOCUMENTS

| | | | | |
|---|---|---|---|---|
| 5,193,636 A * | 3/1993 | Holm | ............... | B60K 11/08 180/68.1 |
| 6,901,903 B2 * | 6/2005 | Nakajima | ............... | B60K 11/04 123/196 AB |
| 7,370,718 B2 * | 5/2008 | Witwer | ............... | F01P 7/10 180/68.1 |
| 7,717,205 B2 * | 5/2010 | Kertz | ............... | B60K 13/04 180/68.1 |
| 8,167,067 B2 * | 5/2012 | Peterson | ............... | F01N 3/055 180/68.2 |
| 8,186,153 B2 * | 5/2012 | Schindler | ............... | F01N 3/021 180/68.2 |
| 8,403,099 B2 * | 3/2013 | Yokota | ............... | B60K 15/063 180/309 |
| 8,505,661 B2 * | 8/2013 | Tsuji | ............... | E02F 3/7609 180/68.4 |
| 8,720,638 B1 | 5/2014 | Nakagami et al. | | |
| 8,936,128 B2 | 1/2015 | Numa | | |
| 8,997,915 B2 * | 4/2015 | Hayashi | ............... | B60K 13/04 180/296 |
| 9,004,212 B2 * | 4/2015 | Noda | ............... | B66C 13/52 16/348 |
| 9,033,081 B1 | 5/2015 | Yamagoe | ............... | B60K 11/02 180/68.1 |
| 9,080,307 B2 * | 7/2015 | Numa | ............... | B60K 11/06 |
| 9,316,136 B2 * | 4/2016 | Kobayashi | ............... | B60K 13/04 |
| 2002/0017408 A1 * | 2/2002 | Oshikawa | ............... | B60K 11/08 180/69.2 |
| 2010/0018732 A1 * | 1/2010 | Daniel | ............... | B60K 11/04 172/781 |
| 2010/0186381 A1 * | 7/2010 | Charles | ............... | F01N 3/025 60/282 |
| 2010/0301638 A1 * | 12/2010 | Hinshaw | ............... | F02M 35/164 296/208 |
| 2011/0203864 A1 * | 8/2011 | Ryczek | ............... | B62D 25/10 180/69.24 |
| 2013/0068177 A1 * | 3/2013 | Yotsuzuka | ............... | E02F 9/0866 123/41.58 |
| 2013/0175109 A1 * | 7/2013 | Takatsuji | ............... | B60K 13/04 180/309 |
| 2013/0319787 A1 * | 12/2013 | Kobayashi | ............... | E02F 9/0866 180/309 |
| 2014/0124283 A1 * | 5/2014 | Novacek | ............... | B60K 13/04 180/309 |
| 2014/0262590 A1 * | 9/2014 | Daborn | ............... | F01N 3/035 180/309 |
| 2014/0318882 A1 * | 10/2014 | Sawada | ............... | B60K 13/04 180/309 |
| 2014/0348716 A1 * | 11/2014 | Park | ............... | F01N 3/2066 422/171 |
| 2015/0001170 A1 * | 1/2015 | Terata | ............... | B01D 53/94 212/302 |
| 2015/0176451 A1 * | 6/2015 | Tsutsumi | ............... | B01D 53/86 60/298 |
| 2015/0184361 A1 | 7/2015 | Imano et al. | | |
| 2015/0198075 A1 * | 7/2015 | Gong | ............... | F01N 3/2066 60/274 |
| 2016/0024752 A1 * | 1/2016 | Mitsuda | ............... | E02F 9/0866 180/296 |

FOREIGN PATENT DOCUMENTS

| | | |
|---|---|---|
| CN | 203160300 U | 8/2013 |
| CN | 104204435 A | 12/2014 |
| EP | 2821608 A1 | 1/2015 |
| JP | 2011529538 A | 12/2011 |
| JP | 2012184602 A | 9/2012 |
| JP | 5329009 B1 | 10/2013 |
| JP | 2014084832 A | 5/2014 |
| JP | 2014177765 A | 9/2014 |
| JP | 2014181718 A | 9/2014 |
| JP | 5676828 B1 | 2/2015 |
| WO | 2012105320 A1 | 8/2012 |
| WO | 2013175981 A1 | 11/2013 |

OTHER PUBLICATIONS

Japanese Office Action (and English translation thereof) dated Dec. 1, 2015, issued in counterpart Japanese Application No. 2015-528746.

Chinese Office Action (and English translation thereof) dated Jul. 25, 2016, issued in counterpart Chinese Application No. 201580000428.9.

Extended European Search Report (EESR) dated Oct. 18, 2016, issued in counterpart European Patent Application No. 15729323.4.

* cited by examiner

WORKING VEHICLE

TECHNICAL FIELD

The present invention relates to a working vehicle.

BACKGROUND ART

Typical wheel loaders as disclosed in Patent Literatures 1 and 2 have been known as a working vehicle equipped with an exhaust gas aftertreatment device for purifying exhaust gas from an engine. The exhaust gas aftertreatment device, which needs to be protected from gravel and the like raised during operation, is disposed above an engine in an engine compartment and covered by an exterior cover.

CITATION LIST

Patent Literature(s)

Patent Literature 1: JP-A-2012-184602
Patent Document 2: JP-B-5329009

SUMMARY OF THE INVENTION

Problems to be Solved by the Invention

The exhaust gas aftertreatment device may be heated by the exhaust gas, but a large amount of airflow is not expected to be sucked into the engine compartment when the wheel loader travels during operation, so that the temperature of the engine compartment considerably rises. As a result, the ambient temperature of the exhaust gas aftertreatment device exceeds the maximum allowable temperature of a peripheral member such as a sensor provided to the exhaust gas aftertreatment device.

An object of the invention is to provide a working vehicle capable of reliably restraining an increase in the ambient temperature of an exhaust gas aftertreatment device in an engine compartment.

Means for Solving the Problems

According to an aspect of the invention, a working vehicle includes: an exhaust gas aftertreatment device disposed above an engine and housed in an engine compartment along with the engine; an upper exterior cover covering an upper side of the engine compartment; an air inlet through which a cooling air is introduced into the engine compartment; and a fan configured to supply the cooling air to the engine compartment through the air inlet, the exhaust gas aftertreatment device including a treatment unit configured to treat exhaust gas, the exhaust gas aftertreatment device being oriented with a longitudinal direction of the treatment unit being parallel with a vehicle front-rear direction, the air inlet being disposed at a front side of the exhaust gas aftertreatment device.

In the above aspect, for instance, outer air is sucked as a cooling air into the engine compartment through the air inlet using the fan. The air flows rearward in the vicinity of the treatment unit of the exhaust gas aftertreatment device while cooling, and is then discharged to the outside of the vehicle using the fan. Since the longitudinal direction of the treatment unit of the exhaust gas aftertreatment device is parallel with the vehicle front-rear direction, the air smoothly flows along the longitudinal direction of the treatment unit without turbulence, thereby reliably restraining an increase in the ambient temperature of the exhaust gas aftertreatment device in the engine compartment.

In the above aspect, it is preferable that the treatment unit of the exhaust gas aftertreatment device include a first treatment unit and a second treatment unit, the first treatment unit and the second treatment unit being arranged side by side in a vehicle-width direction and each including a cylindrical exterior case, and the air inlet include a plurality of air inlets arranged side by side in the vehicle-width direction within a range defined by a position of a center axis of the exterior case of the first treatment unit and a position of a center axis of the exterior case of the second treatment unit projected on the upper exterior cover.

In the above aspect, it is preferable that respective opening center axes of the plurality of air inlets be arranged side by side in the vehicle-width direction within the range defined by the position of the center axis of the exterior case of the first treatment unit and the position of the center axis of the exterior case of the second treatment unit projected on the upper exterior cover.

In the above aspect, it is preferable that the working vehicle further include a gutter member disposed between the upper exterior cover and the exhaust gas aftertreatment device.

In the above aspect, it is preferable that the exhaust heat vent and a gutter portion of the gutter member be in a rectangular shape elongated in the vehicle front-rear direction.

In the above aspect, it is preferable that the exhaust gas aftertreatment device further include a third treatment unit including an exterior case and disposed between the first treatment unit and the third treatment unit, and the air inlets are partly arranged within a range defined on and between the position of the center axis of the exterior case of the first treatment unit and the position of the center axis of the exterior case of the second treatment unit projected on the upper exterior cover, whereas rest of the air inlets is arranged within a range defined by the position of the center axis of the exterior case of the second treatment unit and a position of a center axis of the exterior case of the third treatment unit projected on the upper exterior cover.

DESCRIPTION OF EMBODIMENT(S)

Overall Arrangement of Wheel Loader

Embodiment(s) of the invention will be described below with reference to the attached drawings.

Figure 1:
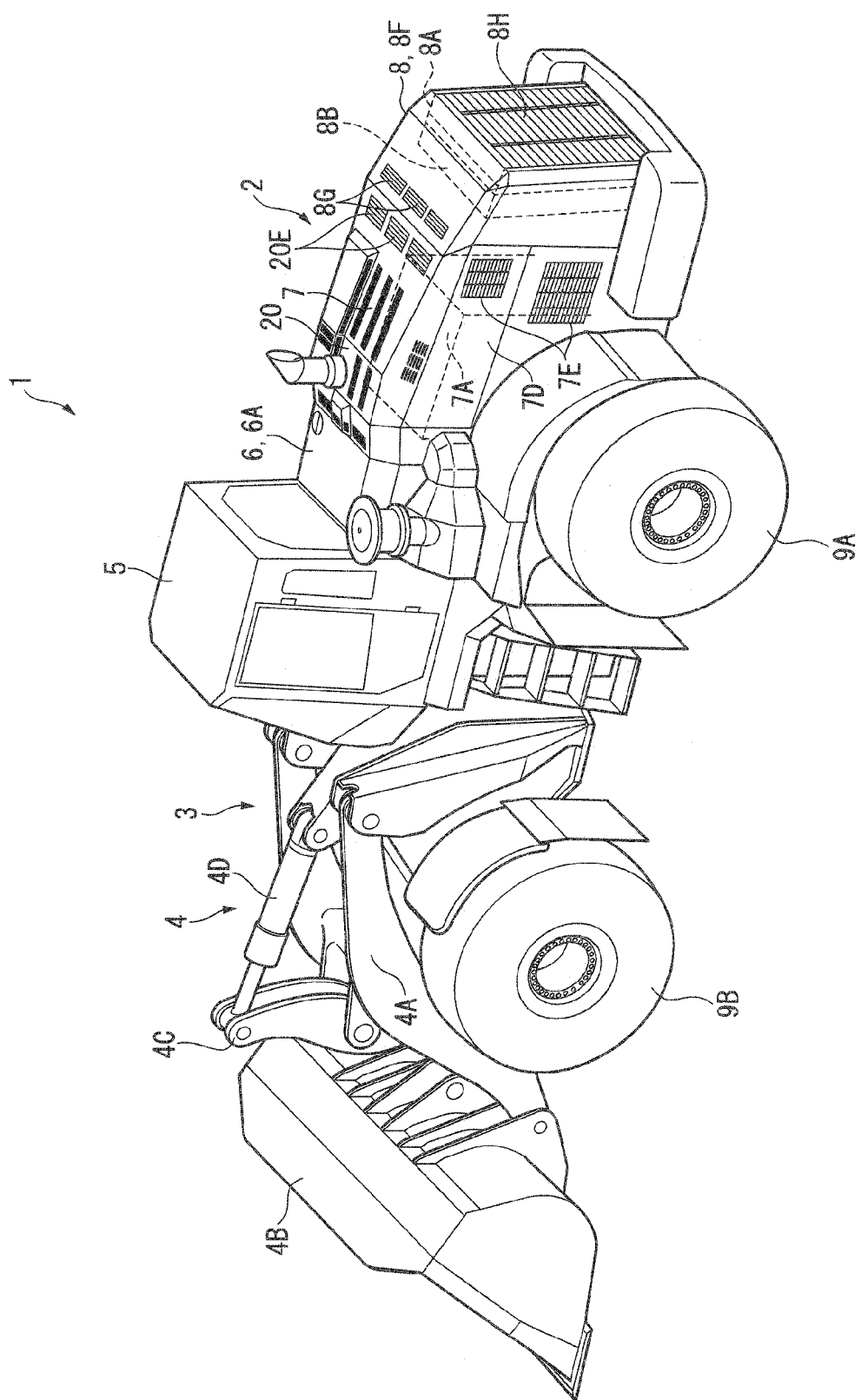
FIG. 1 is a perspective view showing an overall arrangement of a wheel loader according to an exemplary embodiment of the invention.

FIG. 1 is a perspective view showing an overall arrangement of a wheel loader 1 (a working vehicle) according to the exemplary embodiment.

As shown in FIG. 1, the wheel loader 1 includes: a rear vehicle body 2 disposed at a rear side in a vehicle front-rear direction; a front vehicle body 3 disposed at a front side in the vehicle front-rear direction and rotatably connected to the rear vehicle body 2 via a vertical articulating pin (not shown); and working equipment 4 provided to the front vehicle body 3. It should be noted that the terms "front" and "rear" mean "front" and "rear" in the vehicle front-rear direction hereinafter unless they are specifically defined. Similarly, the terms "upstream" and "downstream" mean "upstream" and "downstream" in an exhaust-gas flow direction unless they are specifically defined.

The rear vehicle body 2 includes: a cab 5, in which an operator is to be seated, being disposed near the front vehicle body 3; a hydraulic oil tank compartment 6 disposed at a rear side of the cab 5; an engine compartment 7 disposed at a rear side of the hydraulic oil tank compartment 6 and housing an engine 7A; and a cooling compartment 8 disposed at a rear side of the engine compartment 7. Further, the rear vehicle body 2 is provided with right and left rear wheels 9A (only a left rear wheel shown) at both lateral sides in a vehicle-width direction, the wheels 9A being driven with an engine output transmitted through a transmission.

The working equipment 4 of the front vehicle body 3 includes: a right and left pair of booms 4A each having an end pivotally supported on a frame of the front vehicle body 3 and being vertically swingable around the frame; a swingable bucket 4B pivotally supported on respective distal ends of the booms 4A; and a swingable bell crank 4C pivotally supported on a cross member connecting the booms 4A. The booms 4A are each actuated by a hydraulic boom cylinder (not shown) to vertically move the bucket 4B. The hydraulic boom cylinder has a distal end pivotally supported on each of the booms 4A near a midpoint thereof and a rear end pivotally supported on the frame of the front vehicle body 3. The bell crank 4C is actuated by a hydraulic bucket cylinder 4D to tilt the bucket 4B via a tilt lever (not shown) connected to a lower portion of the bell crank 4C (a lower portion of the bell crank 4C in a position shown in FIG. 1). The bucket cylinder 4D has a distal end pivotally supported on an upper portion of the bell crank 4C (an upper portion of the bell crank 4C in the posture shown in FIG. 1) and a rear end pivotally supported on the frame of the front vehicle body 3.

A hydraulic oil is delivered from the hydraulic oil tank compartment 6 to the boom cylinder and the bucket cylinder 4D, and returned to the hydraulic oil tank compartment 6.

The front vehicle body 3 is provided with right and left front wheels 9B (only a left front wheel shown) driven by the engine output in the same manner as the rear wheels 9A.

Engine Compartment and Cooling Compartment

Figure 2:
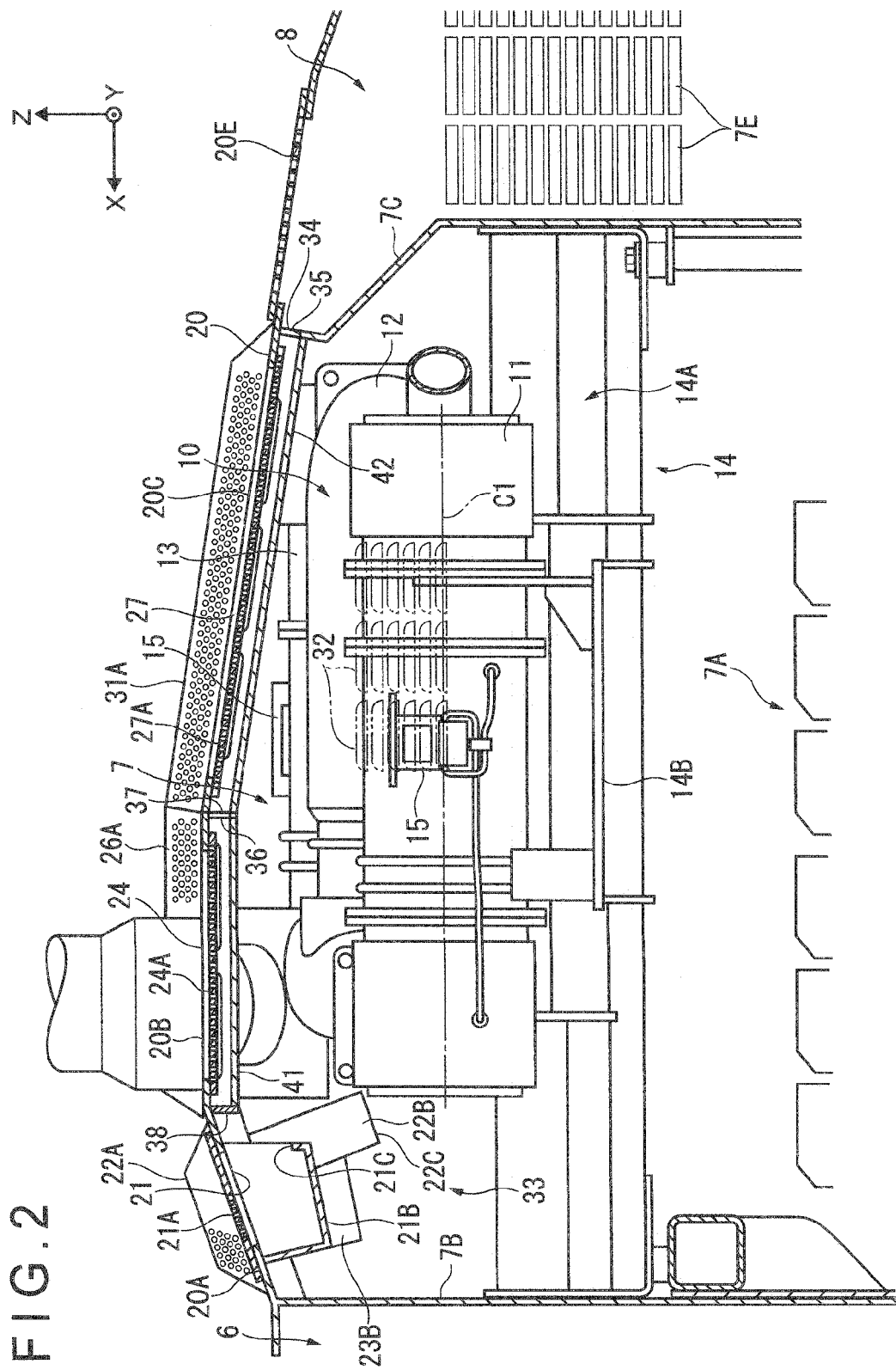
FIG. 2 is a sectional view showing an interior of an engine compartment of the wheel loader.

FIG. 2 is a cross sectional view showing an interior of the engine compartment 7 of the wheel loader 1. Incidentally, regarding coordinate axes shown in FIG. 2, the X axis is parallel with the vehicle front-rear direction where a distal end of the arrow of the X axis corresponds to a vehicle front side and a base end of the arrow of the X axis corresponds to a vehicle rear side. The Y axis is parallel with the vehicle-width direction where a distal end of the arrow of the Y axis corresponds to a vehicle left side and a base end of the arrow of the X axis corresponds to a vehicle right side. The Z axis is parallel with a vehicle top-bottom direction where a distal end of the arrow of the Z axis corresponds to a vehicle upper side and a base end of the arrow of the Z axis corresponds to a vehicle lower side. The same applies to coordinate axes shown in other drawings.

As shown in FIGS. 1 and 2, the engine compartment 7 houses not only the engine 7A but also an exhaust gas aftertreatment device 10, which is disposed above the engine 7A. The engine compartment 7 is separated from the hydraulic oil tank compartment 6 disposed at a front side thereof in the vehicle front-rear direction by a front partition wall 7B. It should be noted that, according to the exemplary embodiment, the whole of the hydraulic oil tank compartment 6 functions as a hydraulic oil tank, and the front partition wall 7B is a component of the hydraulic oil tank. The cooling compartment 8 is disposed at the rear side of the engine compartment 7 behind a rear partition wall 7C (a partition wall). Lateral sides of the engine compartment 7 in the vehicle-width direction are covered by side exterior covers 7D (see FIG. 1), and an upper side of the engine compartment 7 is covered by an upper exterior cover 20.

Figure 4:
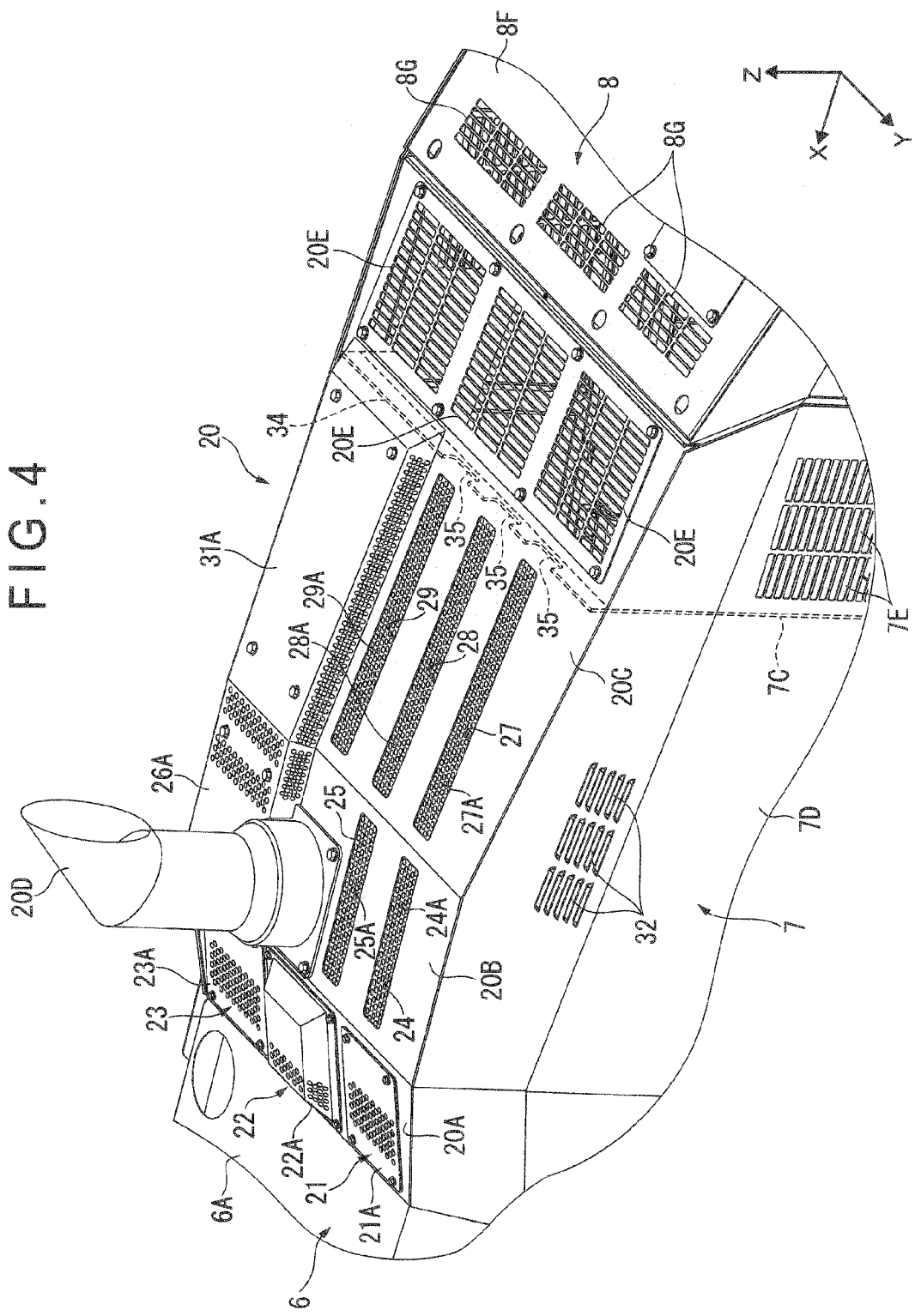
FIG. 4 is a perspective view showing an exterior of an upper exterior cover.

The cooling compartment 8 houses a discharge fan 8A and a cooling unit 8B that includes, for instance, air-conditioner condenser and radiator (see FIG. 1). The side exterior covers 7D and the upper exterior cover 20, which cover the engine compartment 7, have rear portions that cover a front portion of the cooling compartment 8. The rear portions are provided with a plurality of air intake openings 7E, 20E through which outer air is introduced as a cooling air into the cooling compartment 8 as shown in FIGS. 1 and 4. Similarly, a plurality of air intake openings 8G are provided to an upper exterior cover 8F disposed at a rear side of the upper exterior cover 20 to cover the cooling compartment 8.

When the fan 8A is driven to rotate by a drive unit such as a hydraulic motor or an electric motor, air is introduced into the cooling compartment 8 through the air intake openings 7E, 8G, 20E. The air flows through the cooling unit 8B to cool the hydraulic oil, an engine cooling water and an intake air to the engine, and is discharged to the outside of the vehicle from a rear grill 8H using the fan 8A.

Exhaust Gas Aftertreatment Device

Figure 3:
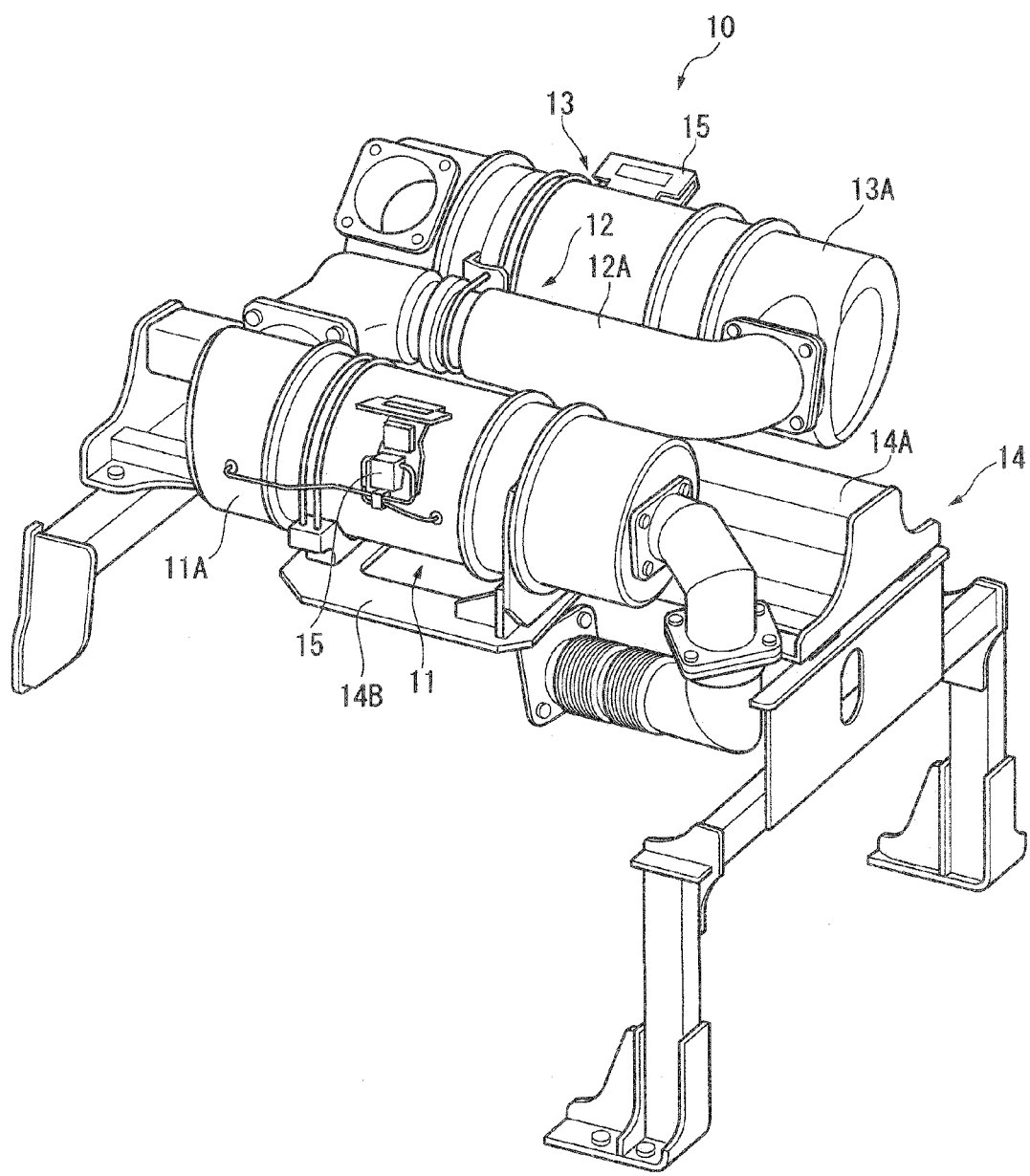
FIG. 3 is a perspective view showing an overall arrangement of an exhaust gas aftertreatment device.

FIG. 3 is a perspective view showing the exhaust gas aftertreatment device 10.

The exhaust gas aftertreatment device 10 shown in FIGS. 2 and 3 is disposed in an exhaust gas passage from the engine 7A at a downstream of an exhaust turbocharger (not shown). The exhaust gas aftertreatment device 10 includes: a diesel particulate filter device (hereinafter, simply referred to as "filter device") 11 disposed at the most upstream in the exhaust-gas flow direction and serving as a first treatment unit including a filter for capturing particulate matters in the exhaust gas; a mixing device 12 disposed at a downstream of the filter device 11 in the exhaust-gas flow direction and serving as a third treatment unit that supplies a reduction-causing agent (e.g., a urea solution) into the exhaust gas so that the reduction-causing agent is mixed with the exhaust gas; and a selective catalytic reduction device 13 disposed at a downstream of the mixing device 12 in the exhaust-gas flow direction and serving as a second treatment unit that purifies the exhaust gas with the assistance of a catalyst using a reduction-causing agent.

The exhaust gas aftertreatment device 10 is installed and oriented with respective longitudinal directions of the filter device 11, the mixing device 12 and the selective catalytic reduction device 13 for exhaust gas treatment being parallel with the vehicle front-rear direction. Incidentally, the respective longitudinal directions of the filter device 11, the mixing device 12 and the selective catalytic reduction device 13 are the same as a direction of a substantially linear stream of the exhaust gas flowing therethrough according to the exemplary embodiment. Further, the filter device 11, the mixing device 12 and the selective catalytic reduction device 13 are arranged side by side in the vehicle-width direction perpendicular to the vehicle front-rear direction. In other words, the exhaust gas aftertreatment device 10 is installed to define an S-shaped exhaust gas flow passage as a whole. Specifically, the exhaust gas flows through the filter device 11 from a rear side to a front side thereof, through the mixing device 12 from a front side to a rear side thereof, and through the selective catalytic reduction device 13 from a rear side to a front side thereof. With this arrangement, the exhaust gas aftertreatment device 10 can be compactly installed in a limited installation space in the engine compartment 7.

The exhaust gas aftertreatment device 10 is supported on the rear vehicle body 2 via a support frame 14. Briefly speaking, the support frame 14, which is not described in detail, includes: a center frame 14A extending in the front-rear direction; and support plates 14B extending from lateral sides of the center frame 14A and supporting the filter device 11 and the selective catalytic reduction device 13. With this arrangement, the filter device 11 and the selective catalytic reduction device 13 are arranged at the lateral sides of the center frame 14A in the vehicle-width direction, whereas the mixing device 12 is disposed at a distance above the center frame 14A, so that the cooling air can flow in the vicinity of these components without being substantially blocked by the support frame 14.

The exhaust gas aftertreatment device 10 is further specifically described below. The filter device 11 includes an oxidation catalyst disposed at an upstream of the filter. A dosing fuel (usually the same as an engine fuel) is supplied into the exhaust gas entering the oxidation catalyst. The dosing fuel is oxidized through the oxidation catalyst, thereby heating the oxidation catalyst to a high temperature and, consequently, activating the exhaust gas flowing through the oxidation catalyst. The activated exhaust gas entering the filter incinerates particulate matters captured by the filter due to an active state of the exhaust gas to help self-regeneration of the filter. Alternatively, the fuel may be supplied into the exhaust gas by post-injection in the engine 7A instead of supplying the dosing fuel into the exhaust gas.

The mixing device 12 includes an injector (not shown) disposed at a position immediately behind an inlet for the exhaust gas flowing from the filter device 11, the injector including an injection nozzle that injects the reduction-causing agent from upstream to downstream in the exhaust-gas flow direction. The reduction-causing agent injected by the injection nozzle is evenly mixed with the exhaust gas in a linear pipe of the mixing device 12.

The catalyst of the selective catalytic reduction device 13 includes additional oxidation catalyst disposed at a downstream of the catalyst. The oxidation catalyst serves to purify the residue of the reduction-causing agent unused by selective catalytic reduction so that the residue of the reduction-causing agent becomes harmless before discharged to the outside of the vehicle.

A cylindrical exterior case 11A of the filter device 11 and a cylindrical exterior case 13A of the selective catalytic reduction device 13 are each attached with a peripheral member 15 including a differential pressure sensor or the like for detecting, for instance, the clogging of the filter with particulate matters and/or the clogging of the catalyst with foreign substances.

Upper Exterior Cover

Figure 5:
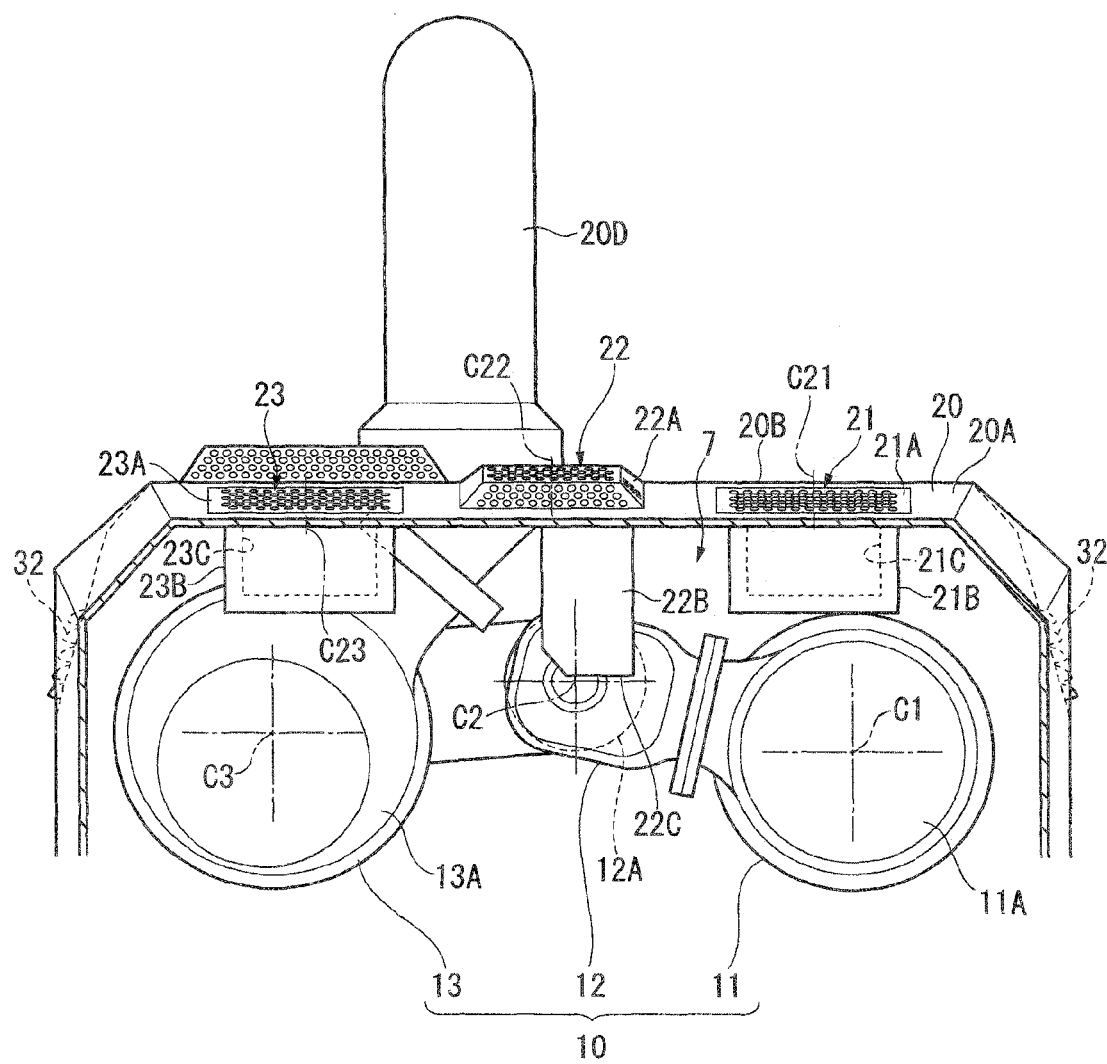
FIG. 5 is a sectional view showing the engine compartment as viewed in a direction from a front side toward a rear side of the vehicle.
Figure 6:
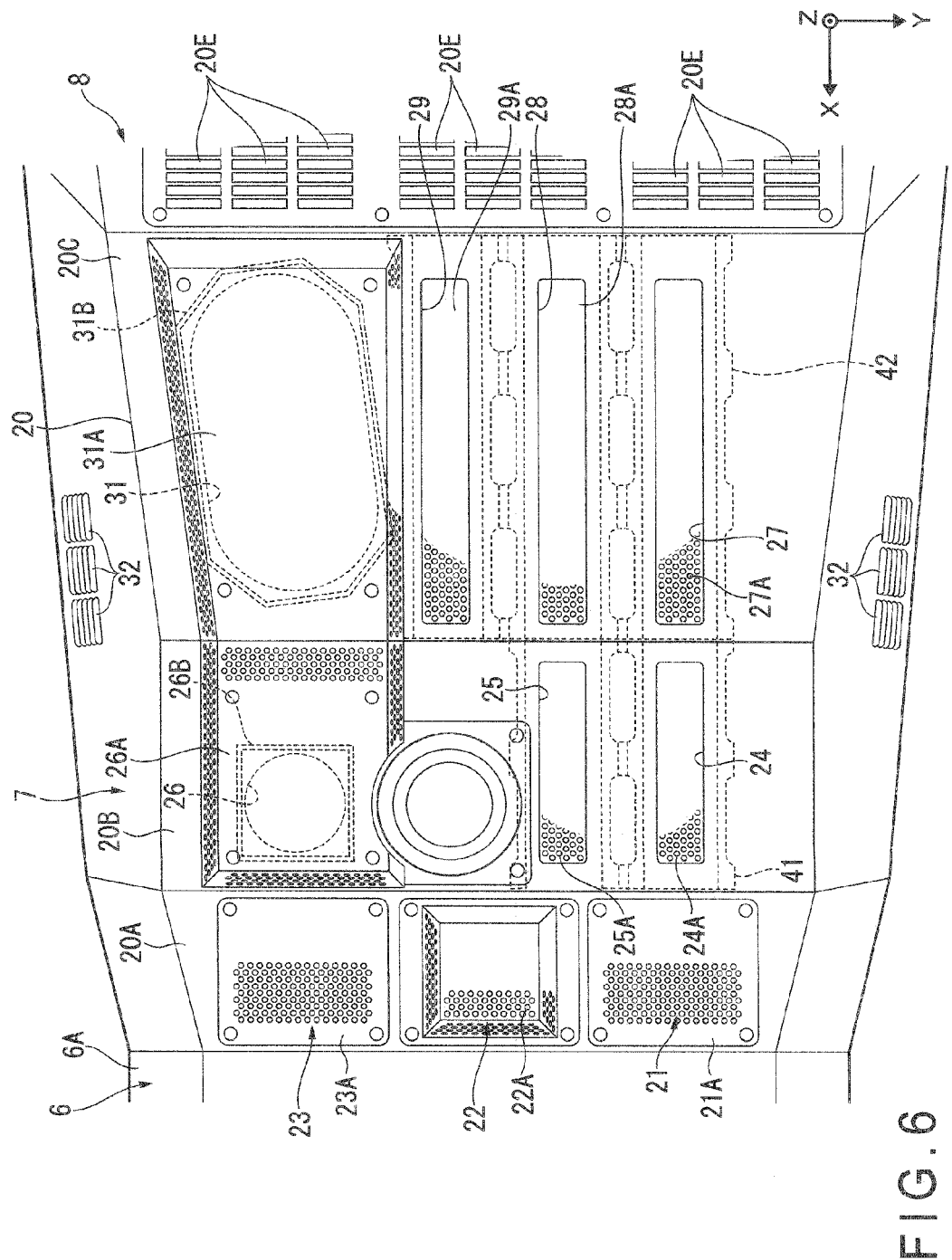
FIG. 6 is a plan view showing an exterior corresponding to the engine compartment.

FIG. 4 is a perspective view showing an exterior of the upper exterior cover 20. FIG. 5 is a sectional view showing the engine compartment 7 as viewed in a direction from a front side toward a rear side of the vehicle. FIG. 6 is a perspective view showing an exterior of a portion corresponding to the engine compartment 7.

As shown in FIGS. 4 to 6, in the engine compartment 7, the exhaust gas aftertreatment device 10 is heated by radiant heat from the exhaust gas flowing therethrough and from the engine 7A, which results in a considerable increase in the ambient temperature of the exhaust gas aftertreatment device 10. Accordingly, a variety of techniques are applied to the upper exterior cover 20 to prevent the ambient temperature of the exhaust gas aftertreatment device 10 from exceeding, especially, the maximum allowable temperature of the peripheral member 15.

The upper exterior cover 20 is removably attached to an edge of the upper exterior cover 6A covering an upper side of the hydraulic oil tank compartment 6 and an edge of the upper exterior cover 8F covering an upper side of the cooling compartment 8.

The upper exterior cover 20 has an upper surface including: a front slope 20A rising from a front side toward a rear side thereof; a horizontal portion 20B continuous with the rear side of the front slope 20A; and a rear slope 20C declining toward a rear side thereof and continuous with a rear side of the horizontal portion 20B.

The front slope 20A is provided with three front air inlets 21, 22, 23 (an air inlet) arranged side by side in the vehicle-width direction. The front air inlets 21, 23 at the lateral sides are respectively covered by punched metal plates 21A, 23A. The front air inlet 22 at the center is covered by a box-shaped hood cover 22A partially made of punched metal. For instance, outer air is sucked through the front air inlets 21, 22, 23 during the operation of the wheel loader 1 or the drive of the fan 8A. The sucked air flows into the vicinity of the exhaust gas aftertreatment device 10 to restrain an increase in the ambient temperature.

The horizontal portion 20B is provided with: two rectangular exhaust heat vents 24, 25 elongated in the front-rear direction and arranged side by side in the vehicle-width direction; and a circular exhaust heat vent 26 disposed adjacent to the exhaust heat vent 25 in the vehicle-width direction with a tail pipe 20D being interposed therebetween (see FIG. 6). The exhaust heat vents 24, 25 are respectively closed by punched metal plates 24A, 25A brought into abutment with a lower surface of the horizontal portion 20B. The exhaust heat vent 26 is covered by a box-shaped hood cover 26A partially made of punched metal.

The rear slope 20C is provided with: three rectangular exhaust heat vents 27, 28, 29 elongated in the front-rear direction and arranged side by side in the vehicle-width direction; and an oblong exhaust heat vent 31 disposed adjacent to the exhaust heat vent 29 in the vehicle-width direction (see FIG. 6). The exhaust heat vents 27, 28, 29 are respectively closed by punched metal plates 27A, 28A, 29A brought into abutment with the lower surface of the horizontal portion 20B. The exhaust heat vent 31 is covered by a box-shaped hood cover 31A partially made of punched metal.

The temperature of the exhaust gas aftertreatment device 10 is still high immediately after the operation of the wheel loader 1 is stopped or the drive of the fan 8A is stopped. Accordingly, the exhaust heat vents 24, 25, 26, 27, 28, 29, 31 are provided to release heat radiated from the exhaust gas aftertreatment device 10 to the outside of the vehicle. Further, when the fan 8A is driven, the exhaust heat vents 24, 25, 26, 27, 28, 29, 31 allow air to be sucked into the engine compartment 7 and allow air used to cool the exhaust gas aftertreatment device 10 to be partially discharged from the engine compartment 7. In contrast, the above-described front air inlets 21, 22, 23 allow heat from the exhaust gas aftertreatment device to be partially released to the outside of the vehicle immediately after the operation of the wheel loader 1 is stopped.

Additionally, a side air inlet 32 is provided by louvering not to the upper exterior cover 20 but to each of the side exterior covers 7D covering the lateral sides of the engine compartment 7 in the vehicle-width direction. The side air inlet 32 is disposed at a horizontal position lateral in the vehicle-width direction to the peripheral member 15 attached to each of the filter device 11 and the selective catalytic reduction device 13. Air is also sucked through the side air inlet 32 during the drive of the fan 8A. The sucked air enters the engine compartment 7 and flows rearward across the peripheral members 15.

Figure 7:
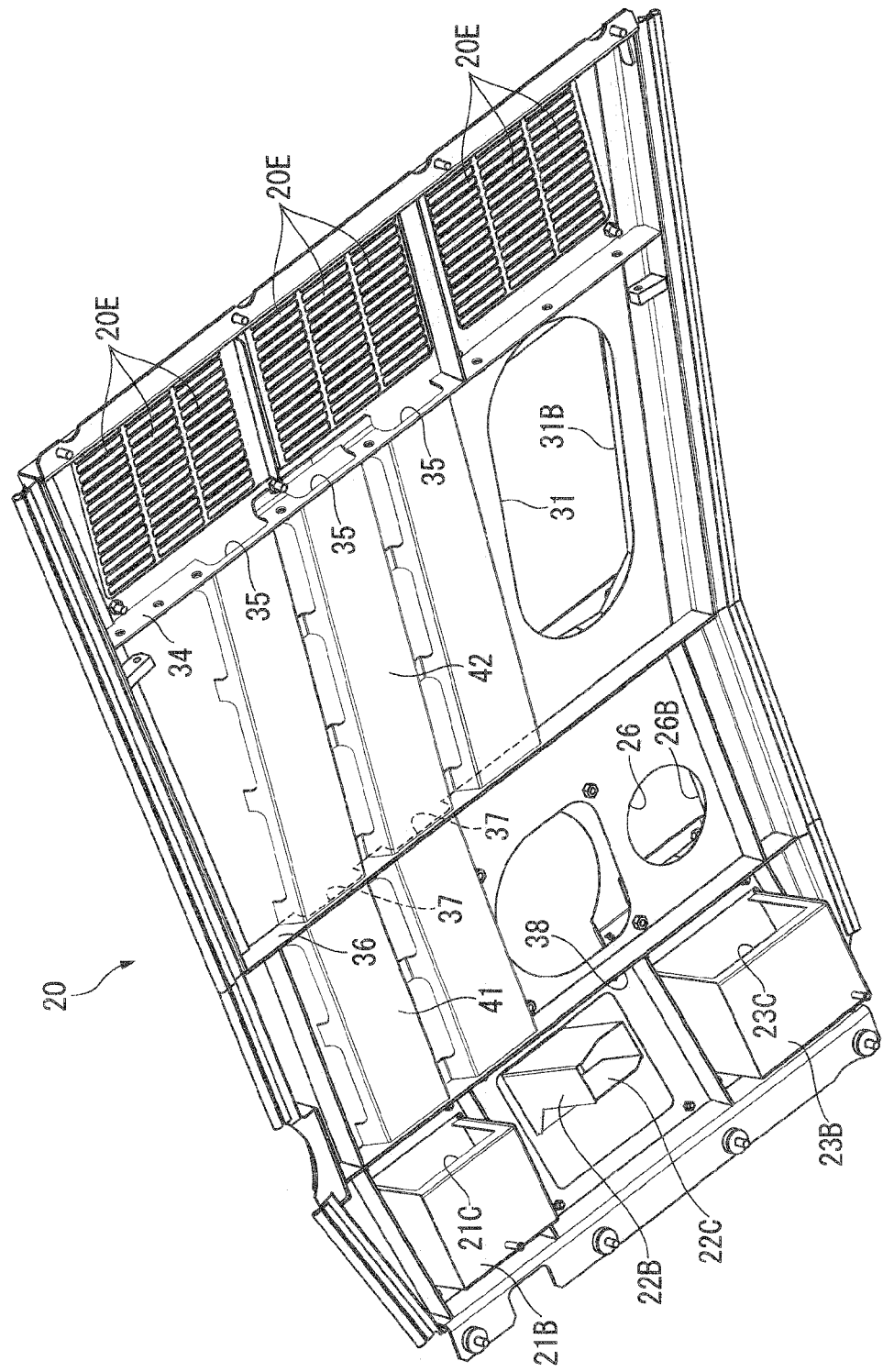
FIG. 7 is a perspective view showing the upper exterior cover as viewed from below a lower surface thereof.
Figure 10:
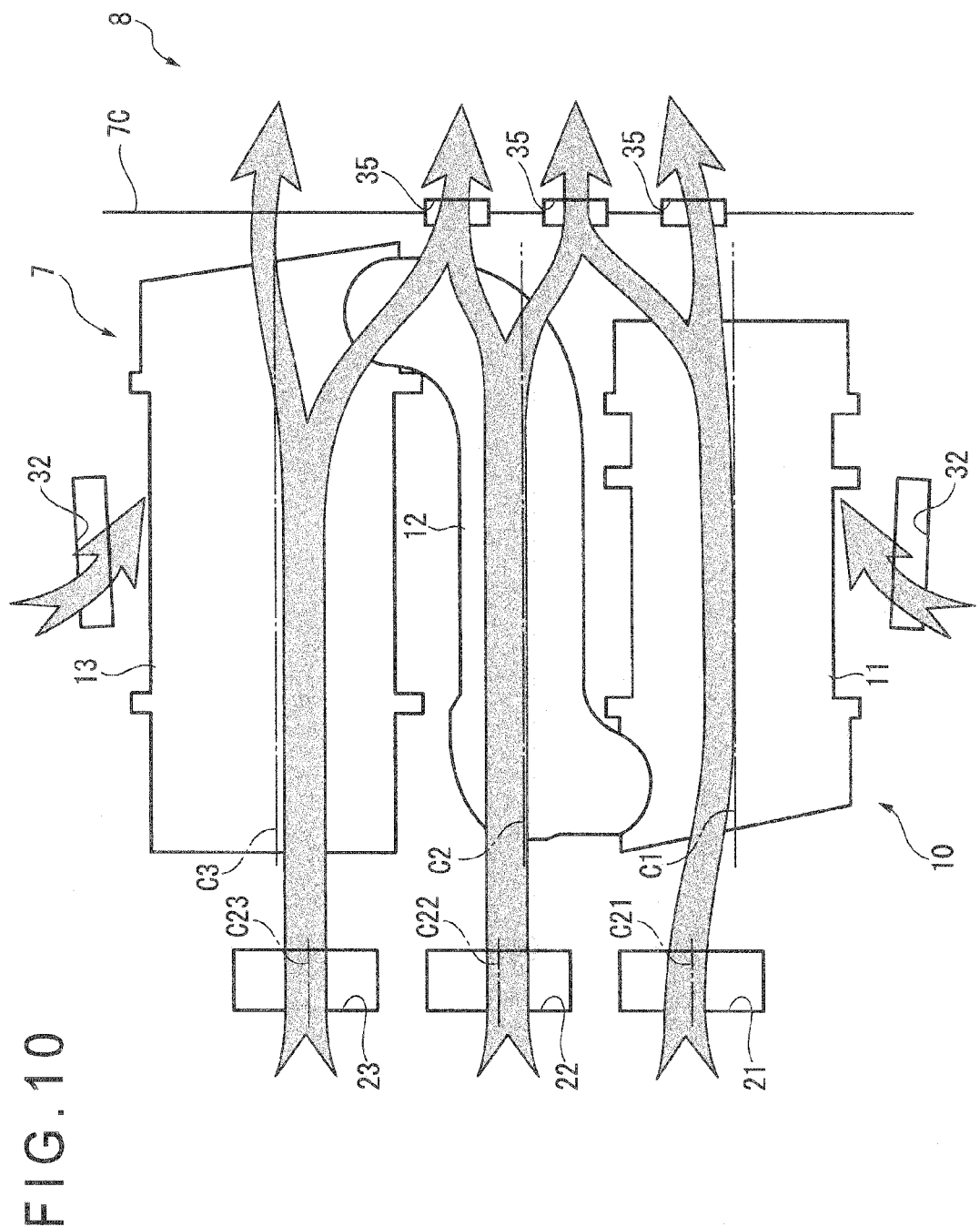
FIG. 10 is a schematic view for illustrating streams of air.

Cooling Arrangement and Streams of Air in the Vicinity of Exhaust Gas Aftertreatment Device FIG. 7 is a perspective view showing the upper exterior cover 20 as viewed from below the lower surface thereof. FIG. 10 is a schematic view for illustrating streams of air (see arrows shaded in gray). FIG. 10 is another schematic view for illustrating the streams of air (see arrows shaded in gray).

In the exemplary embodiment, as shown in FIGS. 2, 5 to 7 and 10, the front air inlets 21, 22, 23 of the upper exterior cover 20, the exhaust gas aftertreatment device 10 and the fan 8A (see FIG. 1) are disposed in sequence from the vehicle front side toward the vehicle rear side. The front air inlets 21, 22, 23 are disposed at a front side of the exhaust gas aftertreatment device 10.

The front air inlets 21, 22, 23 are arranged side by side in the vehicle-width direction within a range defined by the positions of center axes C1, C3 of the cylindrical exterior cases 11A, 13A of the filter device 11 and the selective catalytic reduction device 13 (see FIGS. 2 and 5) projected on the upper exterior cover 20. More specifically, opening center axes C21, C22, C23 of the front air inlets 21, 22, 23, respectively pass through centers of the front air inlets 21, 22, 23 and extend along the vehicle front-rear direction, are arranged side by side within the range defined by the positions of the center axes C1, C3 of the exterior cases 11A, 13A projected on the upper exterior cover 20. Further, the front air inlets 21, 22 are arranged within a range defined by the positions of the center axes C1, C2 of the exterior cases 11A, 12A of the filter device 11 and the mixing device 12 projected on the upper exterior cover 20, whereas the front air inlets 22, 23 are arranged within a range defined by the positions of the center axes C2, C3 of the exterior cases 12A, 13A of the mixing device 12 and the selective catalytic reduction device 13 projected on the upper exterior cover 20.

With the above arrangement, the cooling air sucked through the front air inlets 21, 22, 23 into the engine compartment 7 using the fan 8A is directed toward the rear side of the vehicle along respective tops of the filter device 11, the mixing device 12 and the selective catalytic reduction device 13 of the exhaust gas aftertreatment device 10 while cooling, and is then discharged to the outside of the vehicle using the fan 8A, as shown in FIG. 10, Since the respective longitudinal directions of the filter device 11, the mixing device 12 and the selective catalytic reduction device 13 are parallel with the vehicle front-rear direction, the air smoothly flows along the longitudinal directions without turbulence, thereby reliably restraining an increase in the ambient temperature of the exhaust gas aftertreatment device 10 in the engine compartment 7.

An air intake space 33 (see FIG. 2) is defined in the engine compartment 7 below the front air inlets 21, 22, 23 and between the exhaust gas aftertreatment device 10 and the hydraulic oil tank compartment 6 including the front partition wall 7B (i.e., between the exhaust gas aftertreatment device 10 and the front partition wall 7B). A guide box 21B is disposed below the front air inlet 21. The guide box 21B is attached to the lower surface of the upper exterior cover 20 and projects into the air intake space 33. Similarly, guide boxes 22B, 23B are respectively disposed below the front air inlets 22, 23. The guide boxes 22B, 23B are also attached to the lower surface of the upper exterior cover 20 and project into the air intake space 33.

The guide boxes 21B, 22B, 23B are provided with openings 21C, 22C, 23C, from which the air introduced through the front air inlets 21, 22, 23 is discharged. Since the air intake space 33 is defined in the engine compartment 7 as described above, the guide boxes 21B, 22B, 23B can be disposed to direct the air in a desired direction through the openings 21C, 22C, 23C.

More specifically, the openings 21C, 23C of the guide boxes 21B, 23B at the lateral sides open toward the rear side of the vehicle respectively at positions above the center axes C1, C3 (see FIG. 5) of the cylindrical exterior cases 11A, 13A of the filter device 11 and the selective catalytic reduction device 13 (see FIGS. 2 and 5). The opening 22C of the guide box 22B at the center opens downward to direct the sucked air toward the injector of the mixing device 12 (see FIG. 7) and then rearward. This is because the injector needs to be cooled with enhanced reliability so as not to denature the reduction-causing agent with a low maximum allowable temperature flowing in the injector.

Figure 11:
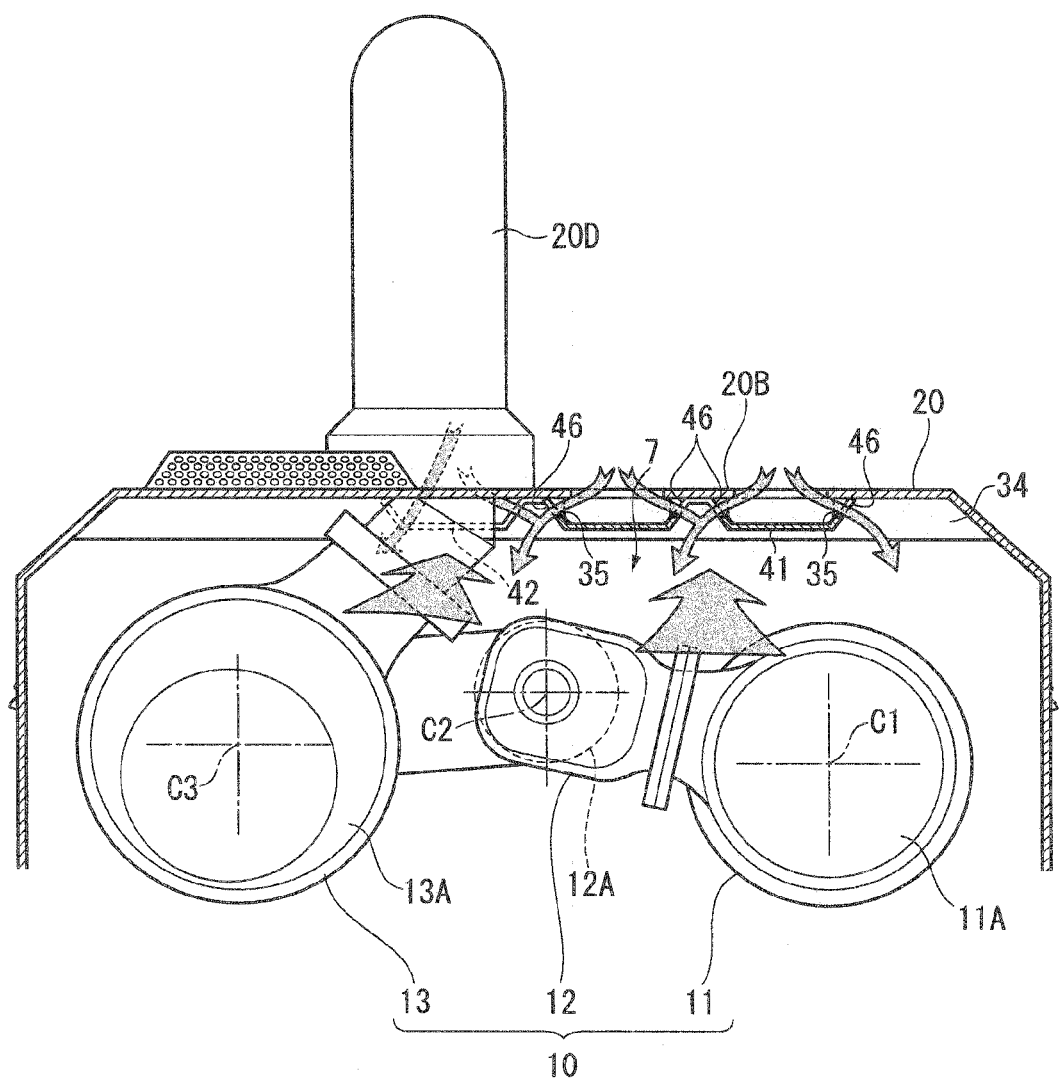
FIG. 11 is another schematic view for illustrating the streams of air.

The front air inlets 21, 23 on the lateral sides are disposed such that the air is sucked at positions shifted toward a center in the vehicle-width direction relative to the center axes C1, C3 of the exterior cases 111A, 13A of the filter device 11 and the selective catalytic reduction device 13, and is then discharged rearward from the openings 21C, 23C. Consequently, as shown in FIG. 11, the air discharged through the openings 21C, 22C, 23C flows in a direction from a near side (the vehicle front side) toward a far side (the vehicle rear side) in FIG. 11 between the filter device 11 and the mixing device 12 along opposite respective peripheral surfaces of the filter device 11 and the mixing device 12 without being blocked by the filter device 11 and the mixing device 12 covered by the cylindrical exterior cases 11A, 12A, and also between the filter device 11 and the selective catalytic reduction device 13 along opposite respective peripheral surfaces of the filter device 11 and the selective catalytic reduction device 13 without being blocked by a front end surface of the selective catalytic reduction device 13.

Further, the air is partially spread in the vehicle-width direction without being blocked by respective front ends of the filter device 11 and the selective catalytic reduction device 13 to reach, beyond respective tops of the cases, far sides of the respective peripheral surfaces of the filter device 11 and the selective catalytic reduction device 13 facing the side exterior covers 7D, and then flows rearward along the respective longitudinal directions of the filter device 11 and the selective catalytic reduction device 13 (not shown by an arrow). In other words, the air flows between the filter device 11 and the one of the side exterior covers 7D and between the selective catalytic reduction device 13 and the other side exterior cover 7D, and then flows rearward along the respective longitudinal directions of the filter device 11 and the selective catalytic reduction device 13.

The air thus evenly flows along substantially the whole of the peripheral surface of each of the filter device 11 and the selective catalytic reduction device 13, so that an increase in the ambient temperature can be further reliably restrained.

Each of the side exterior covers 7D is provided with the side air inlet 32, through which air is introduced to flow in the vicinity of the peripheral member 15, so that an increase in the ambient temperature above the peripheral member 15 can be significantly restrained (see FIG. 10).

The lower surface of the upper exterior cover 20 is provided with a rear partition 34 that corresponds to a boundary between the engine compartment 7 and the cooling compartment 8. The rear partition 34 is disposed along the vehicle-width direction (see also FIGS. 2 and 7). In the exemplary embodiment, the rear partition 34 is a component of the rear partition wall 7C. A part of the rear partition wall 7C, i.e., the rear partition 34, is provided with a plurality of air outlets 35 through which the engine compartment 7 and the cooling compartment 8 are in communication with each other.

The most of the air flowing rearward through the vicinity of the exhaust gas aftertreatment device 10 enters the cooling compartment 8 through the air outlets 35, and is discharged to the outside of the vehicle using the fan 8A after passing through the cooling unit 8B. It should be noted that none of the air outlets 35 is provided near the selective catalytic reduction device 13. A portion of the rear partition wall 7C near the selective catalytic reduction device 13 is penetrated by a pipe extending between the engine compartment 7 and the cooling unit 8B in the cooling compartment 8, and the air enters the cooling compartment 8 from the engine compartment 7 through a clearance between the rear partition wall 7C and the pipe penetrating therethrough.

It should be noted that the air that will enter the engine compartment 7 is partially introduced through the exhaust heat vents 24, 25, 26, and the air flowing rearward through the engine compartment 7 is partially discharged to the outside of the vehicle through the exhaust heat vents 27, 28, 29, 31, as described above.

Heat-release Arrangement in Engine Compartment

As shown in FIGS. 2, 6 and 7, the exhaust heat vents 24, 27 of the upper exterior cover 20 are disposed above the filter device 11 of the exhaust gas aftertreatment device 10, and are arranged along the longitudinal direction of the filter device 11. The exhaust heat vents 25, 28, 29 are disposed above the mixing device 12, and are arranged along the longitudinal direction of the mixing device 12. The exhaust heat vents 26, 31 (see FIG. 6) are disposed above the selective catalytic reduction device 13. The exhaust heat vents 24, 25, 26, 27, 28, 29, 31 are all disposed at a rear side of the front air inlets 21, 22, 23.

Figure 12:
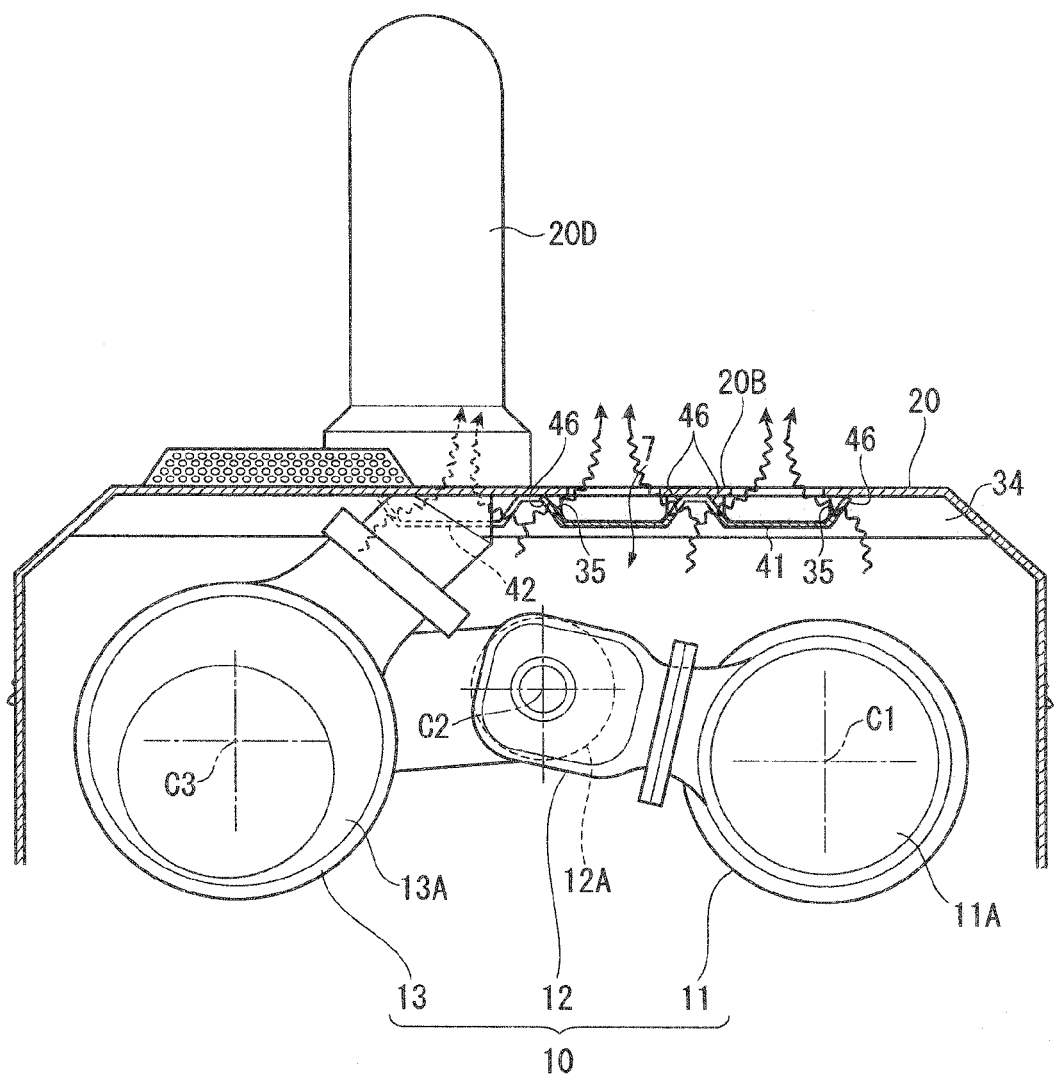
FIG. 12 is a sectional view for illustrating heat release.

In the case where the supply of the cooling air to the engine compartment 7 is shut off (e.g., immediately after the engine 7A of the wheel loader 1 is stopped to stop the operation of the wheel loader 1), heat radiated from the filter device 11, the mixing device 12 and the selective catalytic reduction device 13 is released to the outside of the vehicle through the exhaust heat vents 24, 25, 26, 27, 28, 29, 31 as shown by wavy lines in FIG. 12, thereby reliably restraining an increase in the ambient temperature of the exhaust gas aftertreatment device 10.

As shown in FIG. 7, a first gutter member 41 (a gutter member) is attached to the lower surface of the horizontal portion 20B of the upper exterior cover 20 at a position below the exhaust heat vents 24, 25. A second gutter member 42 (a gutter member) is attached to the lower surface of the rear slope 20C at a position below the exhaust heat vents 27, 28, 29. In other words, the first and second gutter members 41, 42 are disposed between the exhaust gas aftertreatment device 10 and the upper exterior cover 20. The exhaust gas aftertreatment device 10 is thus disposed above the engine 7A and below the first and second gutter members 41, 42. Specifically, a longitudinal direction of each of the rectangular exhaust heat vents 24, 25, 27, 28, 29 and a longitudinal direction of each of gutter portions of the first and second gutter members 41, 42 are parallel with the longitudinal direction of each of the filter device 11, the mixing device 12 and the selective catalytic reduction device 13.

The first and second gutter members 41, 42 are configured to direct rainwater or the like entering through the exhaust heat vents 24, 25, 27, 28, 29 rearward to keep the rainwater away from the exhaust gas aftertreatment device 10. It should be noted that rainwater or the like entering through punched metal portions of the hood covers 26A, 31A covering the exhaust heat vents 26, 31 is blocked by barriers 26B, 31B rising around the exhaust heat vents 26, 31 (see FIG. 6) so as not to enter through the exhaust heat vents 26, 31. Accordingly, no gutter member is present below the exhaust heat vents 26, 31.

Figure 8:
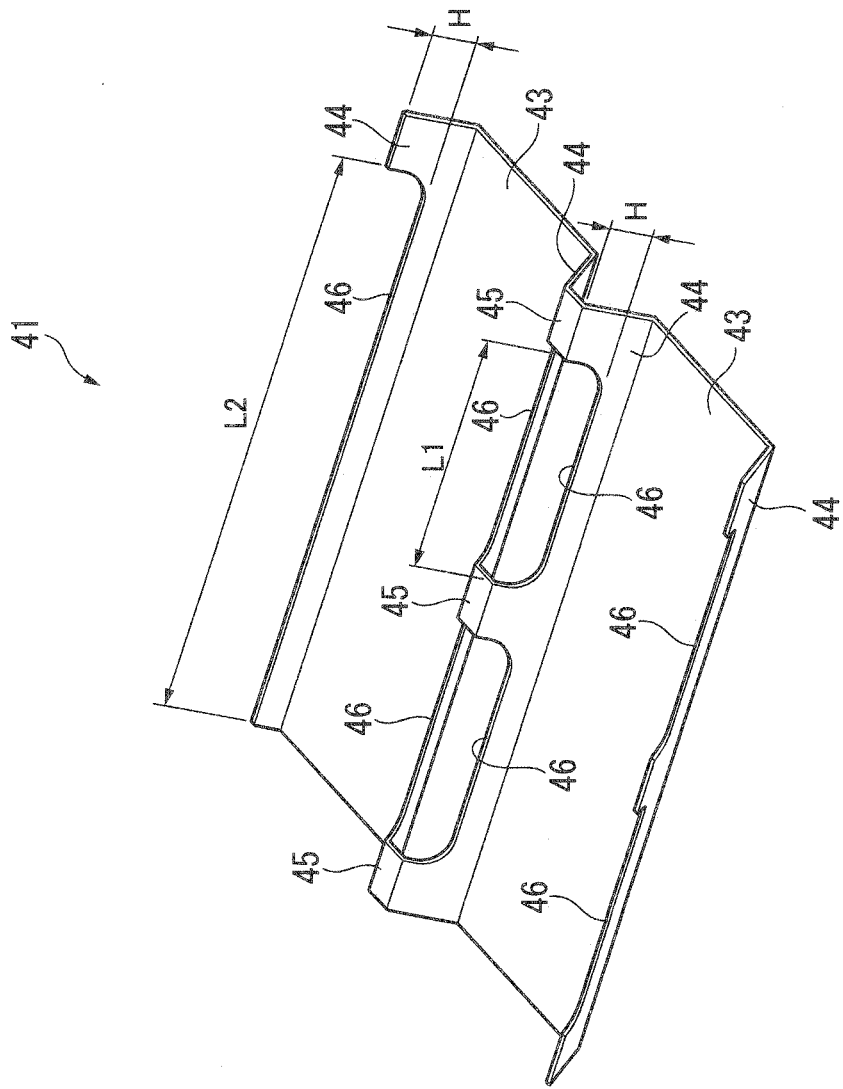
FIG. 8 is a perspective view showing a gutter member.

As also shown in FIG. 8, the first gutter member 41, which is in the shape of a corrugated plate, includes: a pair of first and second bottoms 43 extending in the vehicle front-rear direction and arranged side by side in the vehicle-width direction; and rise portions 44 rising from lateral sides of each of the first and second bottoms 43 to be flared upward. Each of the first and second bottoms 43 and the rising portions 44 at the lateral sides thereof in combination form the gutter portion in a rectangular shape elongated in the vehicle front-rear direction.

The first bottom 43 of the first gutter member 41 is disposed below the exhaust heat vent 24, whereas the second bottom 43 is disposed below the exhaust heat vent 25. Adjacent ones of the rise portions 44 are connected by a connecting portion 45. The rise portions 44 are provided with cutout holes 46 opening upward. Specifically, a pair of cutout holes 46 arranged along the front-rear direction are provided to each of the rise portions 44 of the first bottom 43 and to one of the rise portions 44 of the second bottom 43, whereas a single cutout hole 46 with a continuous length in the front-rear direction is provided to the other rise portion 44 of the second bottom 43.

The first gutter member 41 is integrally formed from a sheet metal by pressing, bending or the like. The first gutter member 41 is attached by, for instance, welding an upper edge of each of the rise portions 44 to the lower surface of the horizontal portion 20B.

Figure 9:
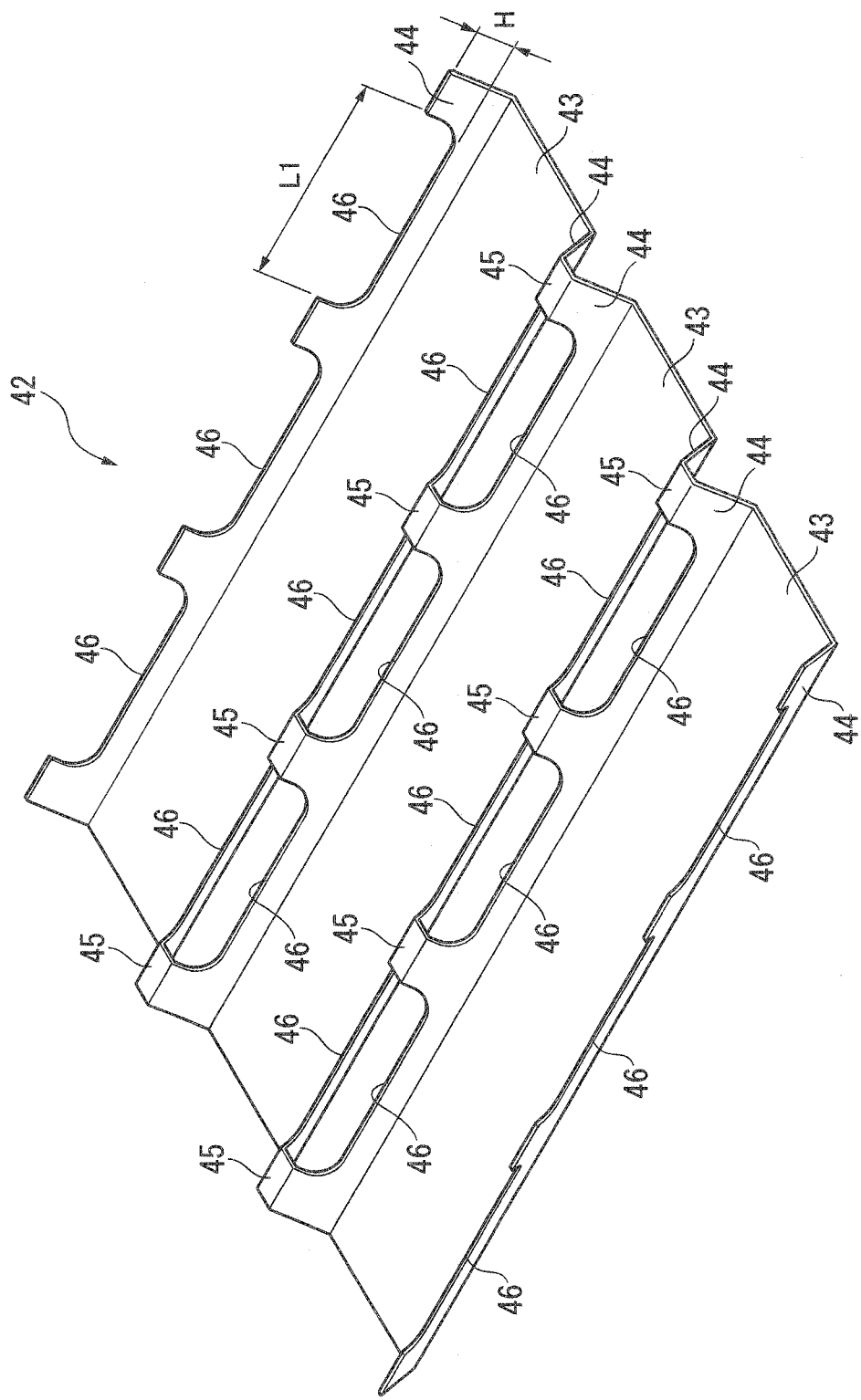
FIG. 9 is a perspective view showing another gutter member.

As shown in FIG. 9, the second gutter member 42 includes three bottoms 43 arranged side by side in the vehicle-width direction. Each of the bottoms 43 is provided with rise portions 44.

The bottoms 43 of the second gutter member 42 at the lateral sides are disposed below the exhaust heat vents 27, 29, and the bottom 43 at the center is disposed below the exhaust heat vent 28. The second gutter member 42 is basically the same in structure as the first gutter member 41 except that the rise portions 44, adjacent ones of which are connected by a connecting portion 45, are each provided with a couple of cutout holes 46 arranged in the front-rear direction.

As shown in FIG. 12, the respective gutter portions of the first and second gutter members 41, 42 and the exhaust heat vents 24, 25, 27, 28, 29 are arranged side by side in the vehicle-width direction within the range defined by the positions of the center axes C1, C3 of the cylindrical exterior cases 11A, 13A of the filter device 11 and the selective catalytic reduction device 13 (see FIGS. 2 and 5) projected on the upper exterior cover 20. More specifically, the exhaust heat vents 24, 25 and the respective gutter portions of the first gutter member 41 and the second gutter member disposed therebelow are arranged within the range defined by the positions of the center axes C1, C2 of the exterior cases 11A, 12A of the filter device 11 and the mixing device 12 projected on the upper exterior cover 20, whereas the exhaust heat vent 29 and the gutter portion of the second gutter member 42 disposed therebelow are arranged within the range defined by the positions of the center axes C2, C3 of the exterior cases 12A, 13A of the mixing device 12 and the selective catalytic reduction device 13 projected on the upper exterior cover 20. It should be noted that merely a portion of each bottom 43 with a predetermined width, not the whole of each gutter portion, needs to be arranged within the range. With the above arrangement, the air flowing through a valley defined between the exterior cases 11A, 12A, 13A can be directed toward the vehicle rear side along flat lower surfaces of the bottoms 43 in the vehicle front side, thereby improving an heat-release effect and, consequently, a cooling effect on the exhaust gas aftertreatment device 10.

A rear end of the first gutter member 41 and a front end of the second gutter member 42 are bonded with a center partition 36 (see FIG. 7), which is provided to the lower surface of the upper exterior cover 20, being interposed therebetween. The center partition 36 is provided with a communication opening 37 through which a pair of gutter portions of the first gutter member 41 are in communication with a pair of gutter portions of the second gutter member 42. A front end of the first gutter member 41 is bonded to a front partition 38 provided to the lower surface of the upper exterior cover 20. A rear end of the second gutter member 42 is bonded to the rear partition 34 and the gutter portions of the second gutter member 42 are in communication with the cooling compartment 8 through the air outlets 35.

Rainwater or the like received on the gutter portions of the first gutter member 41 is directed onto the gutter portions of the second gutter member 42 through the communication opening 37 of the center partition 36 with the assistance of the streams of the air flowing in the vicinity of the first gutter member 41. Subsequently, the rainwater or the like flows rearward on the second gutter member 42 and enters the cooling compartment 8 through the air outlets 35. The rainwater or the like then runs down a surface of the rear partition wall 7C (see FIG. 2) to be drained to the outside of the vehicle. Rainwater or the like received on the second gutter member 42 is drained in the same manner as described above.

The rise portions 44 of the first and second gutter members 41, 42 are provided with the cutout holes 46 to prevent the first and second gutter members 41, 42 from hampering the release of heat from the exhaust gas aftertreatment device 10 to the outside of the vehicle. In other words, as shown in FIG. 12, since the engine compartment 7 is in communication with the exhaust heat vents 24, 25, 27, 28, 29 through the cutout holes 46, heat radiated from the exhaust gas aftertreatment device 10 is released to the outside of the vehicle from the exhaust heat vents 24, 25, 27, 28, 29 through the cutout holes 46 immediately after the operation of the wheel loader 1 is stopped. Accordingly, a dimension H and dimensions L1, L2 of the cutout holes 46 are determined such that an opening area of the punched metal plates 24A, 25A, 27A, 28A, 29A covering the exhaust heat vents 24, 25, 27, 28, 29 becomes equal to an opening area of the cutout holes 46 of the gutter portions corresponding to the exhaust heat vents 24, 25, 27, 28, 29.

Consequently, when the fan 8A is stopped, heat from the exhaust gas aftertreatment device 10 can be reliably released from the exhaust heat vents 24, 25, 27, 28, 29. It should be noted that, when the fan 8A is driven, the air flowing through the engine compartment 7 eventually enters the gutter portions through the cutout holes 46 so that the air is directed into the cooling compartment 8 from the gutter portions through the air inlets 35.

Advantage(s) of Exemplary Embodiment

According to the above-described exemplary embodiment, an increase in the ambient temperature of the exhaust gas aftertreatment device in the engine compartment can be reliably restrained even when the supply of the cooling air to the engine compartment is shut off.

Incidentally, the invention is not limited to the above-described exemplary embodiment, but includes modifications and improvements compatible with the invention.

For instance, although the exhaust gas aftertreatment device 10 includes the filter device 11, the mixing device 12 and the selective catalytic reduction device 13 in the exemplary embodiment, an exhaust gas aftertreatment device according to the invention may consist solely of a filter device or an oxidation catalyst to be supplied with a dosing fuel or a post-injection fuel, or may consist of a mixing device and a selective catalytic reduction device. In other words, as long as the exhaust gas aftertreatment device is provided with a treatment unit for purifying exhaust gas, the type, the number and the like of the treatment unit(s) are not specifically limited.

The invention is applicable not only to a wheel loader but also to working vehicles such as a motor grader.

The invention claimed is:
1. A working vehicle comprising:
  an exhaust gas aftertreatment device disposed above an engine and housed in an engine compartment along with the engine;
  an upper exterior cover covering an upper side of the engine compartment;
  an air inlet through which a cooling air is introduced into the engine compartment; and
  a discharge fan configured to supply the cooling air to the engine compartment through the air inlet,
  wherein:
  the exhaust gas aftertreatment device comprises a treatment unit configured to treat exhaust gas,
  the exhaust gas aftertreatment device is oriented with a longitudinal direction of the treatment unit being parallel with a vehicle front-rear direction,
  the treatment unit includes a first treatment unit and a second treatment unit that are arranged side by side in a vehicle-width direction,
  the air inlet, the exhaust gas aftertreatment device, and the discharge fan are disposed sequentially in this order from a front side to a rear side of the working vehicle,
  the working vehicle further comprises a gutter member disposed between the upper exterior cover and the exhaust gas aftertreatment device and above the exhaust gas aftertreatment device in a manner vertically overlapping with the exhaust gas aftertreatment device, the gutter member comprises a bottom extending in the vehicle front-rear direction and in the vehicle-width direction and a rise portion rising from the bottom on lateral sides of the bottom in the vehicle-width direction, and the bottom is positioned within a range defined by a position of a center axis of a cylindrical exterior case of the first treatment unit and a position of a center axis of a cylindrical exterior case of the second treatment unit projected on the upper exterior cover.

2. The working vehicle according to claim 1, wherein:

the air inlet comprises a first air inlet positioned at a front side of the first treatment unit and a second air inlet positioned at a front side of the second treatment unit, an air intake space is defined below the first and second air inlets and in front of the exhaust gas aftertreatment device, a first guide box is disposed below the first air inlet, the first guide box comprising a first opening through which air sucked through the first air inlet flows out, the first guide box being attached to the upper exterior cover and projected into the air intake space, a second guide box is disposed below the second air inlet, the second guide box comprising a second opening through which air sucked through the second air inlet flows out, the second guide box being attached to the upper exterior cover and projected into the air intake space, and the first and second air inlets are disposed at positions shifted toward a center in the vehicle-width direction with respect to the center axes of the exterior cases of the first and second treatment units.

3. The working vehicle according to claim 2, wherein:

the exhaust gas aftertreatment device further comprises a third treatment unit comprising an exterior case and disposed between the first treatment unit and the second treatment unit, the air inlet further comprises a third air inlet disposed in front of the third treatment unit, the first and third air inlets are partly arranged within a range defined on and between the position of the center axis of the exterior case of the first treatment unit and a position of a center axis of the exterior case of the third treatment unit projected on the upper exterior cover, and the second and third air inlets are partly arranged within a range defined by the position of the center axis of the exterior case of the second treatment unit and the position of the center axis of the exterior case of the third treatment unit projected on the upper exterior cover.

4. The working vehicle according to claim 2, wherein:

the exhaust gas aftertreatment device further comprises a third treatment unit comprising an exterior case and disposed between the first treatment unit and the second treatment unit, the air inlet further comprises a third air inlet disposed in front of the third treatment unit, the first air inlet and a part of the third air inlet are arranged within a range defined on and between the position of the center axis of the exterior case of the first treatment unit and a position of a center axis of the exterior case of the third treatment unit projected on the upper exterior cover, and the second air inlet and a rest of the third air inlet are arranged within a range defined by the position of the center axis of the exterior case of the second treatment unit and the position of the center axis of the exterior case of the third treatment unit projected on the upper exterior cover.

5. The working vehicle according to claim 1, wherein the air inlet comprises a plurality of air inlets arranged side by side in the vehicle-width direction within the range defined by the position of the center axis of the exterior case of the first treatment unit and the position of the center axis of the exterior case of the second treatment unit projected on the upper exterior cover.

6. The working vehicle according to claim 5, wherein respective opening center axes of the plurality of air inlets are arranged side by side in the vehicle-width direction within the range defined by the position of the center axis of the exterior case of the first treatment unit and the position of the center axis of the exterior case of the second treatment unit projected on the upper exterior cover.

* * * * *